US010909659B2

(12) United States Patent
Croxford

(10) Patent No.: US 10,909,659 B2
(45) Date of Patent: Feb. 2, 2021

(54) SUPER-RESOLUTION IMAGE PROCESSING USING A MACHINE LEARNING SYSTEM

(71) Applicant: Apical Limited, Cambridge (GB)

(72) Inventor: Daren Croxford, Swaffham Prior (GB)

(73) Assignee: Apical Limited, Cambridge (GB)

( * ) Notice: Subject to any disclaimer, the term of this patent is extended or adjusted under 35 U.S.C. 154(b) by 133 days.

(21) Appl. No.: 16/218,279

(22) Filed: Dec. 12, 2018

(65) Prior Publication Data

US 2020/0193566 A1    Jun. 18, 2020

(51) Int. Cl.
| | |
|---|---|
| *G06N 3/08* | (2006.01) |
| *G02B 30/00* | (2020.01) |
| *G06T 3/40* | (2006.01) |
| *G06T 5/00* | (2006.01) |
| *G06T 19/00* | (2011.01) |
| *G06T 7/55* | (2017.01) |

(52) U.S. Cl.
CPC ............ *G06T 3/4069* (2013.01); *G02B 30/00* (2020.01); *G06N 3/08* (2013.01); *G06T 5/008* (2013.01); *G06T 7/55* (2017.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2005/0140684 A1* | 6/2005 | Buehler | ................ | G06T 15/005 345/531 |
| 2014/0333625 A1* | 11/2014 | Itkowitz | .................. | G06T 15/20 345/426 |
| 2017/0200252 A1* | 7/2017 | Nguyen | ................ | G06F 9/3871 |
| 2017/0347110 A1* | 11/2017 | Wang | ...................... | G06T 5/001 |
| 2018/0096527 A1* | 4/2018 | Eraker | ............... | G06Q 30/0643 |

FOREIGN PATENT DOCUMENTS

WO    00/19377    4/2000

OTHER PUBLICATIONS

Jianchao Yang et al: Image Super-Resolution: Historical Overview and Future Challenges (http://www.ifp.illinois.edu/~jyang29/papers/chap1.pdf).
Super-Resolution.
Wei-Sheng Lai et al: Fast and Accurate Image Super Resolution with Deep Laplacian Pyramid Networks, Aug. 9, 2018.

(Continued)

*Primary Examiner* — Idowu O Osifade
(74) *Attorney, Agent, or Firm* — EIP US LLP

(57) ABSTRACT

A method of super-resolution image processing. The method includes inputting first image data representative of a first version of at least part of an image with a first resolution to a machine learning system. The first image data includes pixel intensity data representative of an intensity value of at least one color channel of a pixel of the first version of the at least part of the image, and feature data representative of a value of at least one non-intensity feature associated with the pixel. The first image data is processed using the machine learning system to generate second image data representative of a second version of the at least part of the image with a second resolution greater than the first resolution.

20 Claims, 10 Drawing Sheets

(56) References Cited

OTHER PUBLICATIONS

Jung-Woo Chang et al: An Energy-Efficient FPGA-based Deconvolutional Neural Networks Accelerator for Single Image Super-Resolution, IEEE.
Bee Lim et al.: Enhanced Deep Residual Networks for Single Image Super-Resolution; Department of ECE, ASRI, Seoul National University, 08826, Seoul, Korea, Jul. 10, 2017.
Ying Tai et al: Image Super-Resolution via Deep Recursive Residual Network; 1Department of Computer Science and Engineering, Nanjing University of Science and Technology and Department of Computer Science and Engineering, Michigan State University.

* cited by examiner

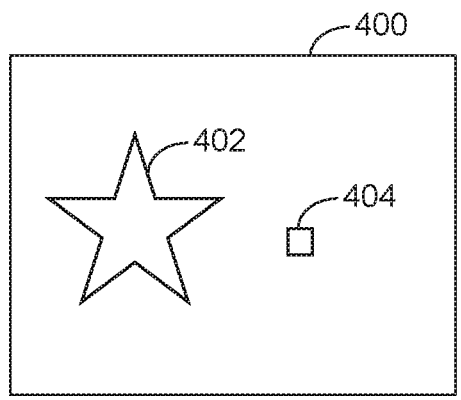 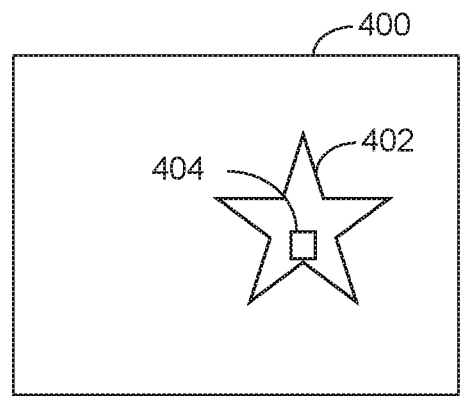
FIG. 9a   FIG. 9b
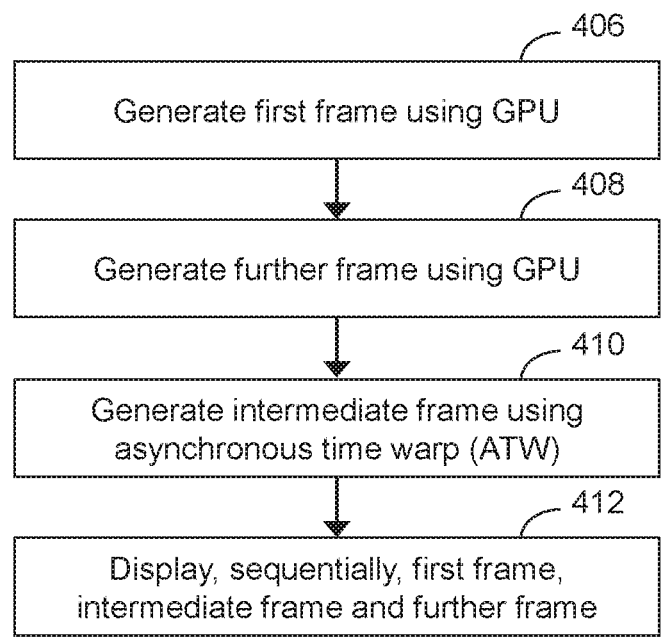
FIG. 10

SUPER-RESOLUTION IMAGE PROCESSING USING A MACHINE LEARNING SYSTEM

TECHNICAL FIELD

The present invention relates to methods and apparatus for processing image data representative of an image, for example to perform super-resolution image processing.

BACKGROUND

Super-resolution image processing may be used to increase a resolution of an image. Super-resolution image processing methods to produce a higher resolution image with a desired image quality may, however, be computationally intensive.

SUMMARY

According to a first aspect of the present disclosure, there is provided a method of super-resolution image processing, the method comprising: inputting first image data representative of a first version of at least part of an image with a first resolution to a machine learning system, the first image data comprising: pixel intensity data representative of an intensity value of at least one color channel of a pixel of the first version of the at least part of the image; and feature data representative of a value of at least one non-intensity feature associated with the pixel; and processing the first image data using the machine learning system to generate second image data representative of a second version of the at least part of the image with a second resolution greater than the first resolution.

According to another aspect of the present disclosure, there is provided a processing system configured to perform super-resolution image processing, wherein the processing system is configured to: retrieve, from storage accessible to the processing system, first image data representative of a first version of at least part of an image with a first resolution, the first image data comprising: pixel intensity data representative of an intensity value of at least one color channel of a pixel of the first version of the at least part of the image; and feature data representative of a value of at least one non-intensity feature associated with the pixel; and implement a machine learning system to perform the super-resolution image processing by, upon receipt of the first image data as an input, processing the first image data to generate second image data representative of a second version of the at least part of the image with a second resolution greater than the first resolution.

BRIEF DESCRIPTION OF THE DRAWINGS

Further features will become apparent from the following description, given by way of example only, which is made with reference to the accompanying drawings.

FIGS. 9a and 9b are schematic diagrams illustrating display of an image using a virtual reality (VR) system according to examples;

FIG. 10 is a flow diagram illustrating a method involving a VR image processing pipeline;

DETAILED DESCRIPTION

Figure 1:
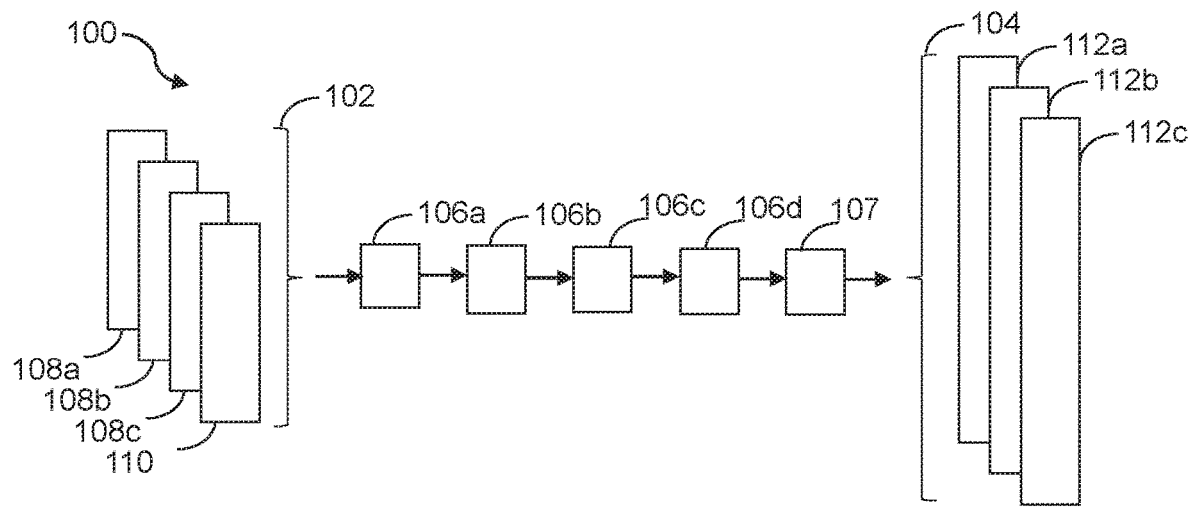
FIG. 1 is a schematic diagram illustrating a neural network according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of super-resolution image processing. The method includes inputting first image data representative of a first version of at least part of an image with a first resolution to a machine learning system. The first image data includes pixel intensity data representative of an intensity value of at least one color channel of a pixel of the first version of the at least part of the image. In addition to the pixel intensity data, the first image data also includes feature data representative of a value of at least one non-intensity feature associated with the pixel. The first image data is processed using the machine learning system to generate second image data representative of a second version of the at least part of the image with a second resolution greater than the first resolution. In this way, the resolution of the at least part of the image is increased from the first resolution to the second resolution. For example, the second version of the at least part of the image may include more pixels than the first version of the at least part of the image. The second version of the at least part of the image may therefore be larger than the first version of the at least part of the image (although need not be). By performing super-resolution image processing, the detail in the at least part of the image may be increased. This may therefore reduce the appearance of blurring or lack of clarity in the at least part of the image. It is to be appreciated that an image as referred to herein may be a part of a larger image. Hence, if processing is described as being applied to an image, the image itself may be a part of a larger image such that the processing is applied to the part of the larger image rather than to the entirety of the larger image.

In the examples described herein, the feature data is processed in addition to the pixel intensity data by the machine learning system to perform the super-resolution image processing. An intensity value represented by the pixel intensity data may be representative of a brightness of the pixel for a grayscale image, or a brightness of a given color component of the pixel for a color image. The pixel intensity data for a given pixel may represent an intensity value associated with a particular color channel or may include a plurality of intensity values associated with each of a plurality of color channels. It is to be appreciated that a grayscale image may be considered to include a single color channel. An intensity value may take a value within a predetermined range. Where the intensity value is for a single color channel, the intensity value may take a value from 0 (e.g. representing a black or darkest intensity) to 255 (e.g. representing white or a lightest intensity) for 8-bit pixel intensity data for a given color channel.

In contrast, the feature data represents a value of at least one non-intensity feature. A non-intensity feature is for example any other feature that may be associated with a given pixel or with a region of an image that includes the given pixel and that represents a characteristic of the pixel or image region other than its intensity. For example, a non-intensity feature may be a depth, a texture or a surface normal of a pixel or an image region. In this way, the feature data provides additional information about the pixel or image region. This therefore allows the machine learning system to more accurately increase the resolution of the at least part of the image to generate the second version of the at least part of the image. Furthermore, the methods described herein may be less computationally intensive to generate an upscaled image of a desired quality than other super-resolution image processing methods.

As an illustrative example, the first version of an image may include two neighboring pixels which each represent a different part of the same object in the image of a scene. However, due to a difference in a relative position between the two parts of the object in the scene, an intensity value associated with the two neighboring pixels may differ. For example, the two neighboring pixels may each represent different parts of a brick, which is part of a brick wall in the scene. However, one of the pixels may be darker in color (for example with a lower intensity value) than the other, due to a difference in lighting at the pixels, e.g. if the brick is angled into the scene, so it appears to recede towards a background of the scene. Nevertheless, a texture associated with each of the pixels may be the same, as each of the pixels is associated with the same object (a brick).

The texture of the pixels may be input to the machine learning system as feature data, in addition to intensity data representative of an intensity of the pixels. Using the feature data, the machine learning system may be able to more accurately generate an intensity for a new pixel with a position in between a position of the two input pixels. For example, the machine learning system may generate an appropriate intensity value for the new pixel so that the new pixel also appears to have the texture of a brick, but with an intensity in between that of the two original neighboring pixels. The appearance of the second version of the at least part of the image may therefore more closely resemble that of the first version of the at least part of the image than with other super-resolution image processing methods. For example, the second version of the at least part of the image may include more detail and reduced blurring than an upscaled image generated using other super-resolution image processing methods that use a similar amount of processing resources. It is to be appreciated, though, that the feature data may represent a different non-intensity feature than texture in other examples.

Methods in accordance with examples herein may also or instead be used to perform super-resolution image processing to generate an image (or at least part of an image) with a predetermined resolution more efficiently than other methods. For example, the methods described herein may use fewer computing resources or may be more computationally efficient than other methods. As an example, the machine learning system of the methods herein may include a series of layers (as described further with reference to FIG. 1). However, the total number of layers may be smaller than a total number of layers of machine learning systems used in other super-resolution image processing methods.

FIG. 1 is a schematic diagram illustrating a neural network (NN) according to examples. The NN of FIG. 1 may be used as the machine learning system referred to in examples herein. In other examples, though, other machine learnings systems may be used. A machine learning system is, for example, a so-called artificial intelligence system that involves the use of statistical techniques to facilitate the learning of a given task by a computer system or device. For example, a machine learning system may be trained, using data, to perform a particular task, without being directly programmed to perform that task.

The NN of FIG. 1 is a convolutional neural network (CNN) 100, although it is to be appreciated that other machine learning systems, such as other NNs, may be used in other examples. The CNN 100 is arranged to receive an input 102 and to generate an output 104. The CNN 100 of FIG. 1 includes convolutional layers 106a-106d and a deconvolutional layer 107 between the input 102 and the output 104, although this is merely an example and other NNs may include more or fewer layers or layer(s) of different types.

In FIG. 1, the input 102 is first image data representative of a first version of an image, which includes pixel intensity data 108a, 108b, 108c. In this example, the pixel intensity data 108a, 108b, 108c includes pixel intensity data for three color channels (in this case, red, green and blue color channels). The pixel intensity data for each color channel is for example in the form of a two-dimensional (2D) matrix of intensity values for the 2D array of pixels in the first version of the image.

The first image data received as an input 102 to the CNN 100 of FIG. 1 also includes feature data 110, which represents non-intensity feature values. In the example of FIG. 1, the feature data 110 is of the same dimensionality as the pixel intensity data 108a, 108b, 108c for a given color channel. In other words, there is a corresponding feature value for each pixel of the first version of the image, such that there is a one-to-one mapping between feature values and pixels. However, in other examples, the dimensionality of the feature data 110 may differ from that of the pixel intensity data. For example, the feature data may represent a non-intensity feature which is associated with a plurality of pixels of the first version of the image. In such cases, there may be a one-to-many mapping between feature values and pixels.

In FIG. 1, the feature data 110 represents feature values for a single non-intensity feature (such as a single type of feature or characteristic). However, in other examples, the feature data 110 may represent a plurality of different feature values. In such cases, the feature data 110 may include a plurality of sub-sets of feature data, each associated with a different respective non-intensity feature. Each sub-set of feature data may include feature values for each pixel for a given feature, or for a plurality of pixels for that given feature.

In the example of FIG. 1, the CNN 100 has been trained to perform super-resolution image processing, for example to increase a resolution of a first version of an image based on first image data including the pixel intensity data 108a-108c and the feature data 110. As a single image (the first version of the image) is used to generate a higher resolution image (a second version of the image), this method may be referred to as single image super-resolution image processing. Training of the CNN 100 for example generates one or more kernels associated with each of the convolutional layers 106a-106d and the deconvolutional layer 107. ANN typically includes a number of interconnected nodes, which may be referred to as artificial neurons, or neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights (which for example correspond with respective elements of kernels associated with layers of the NN) may be adjusted throughout training, altering the output of individual neurons and hence of the NN as a whole.

After the training phase, the CNN 100 (which may be referred to as a trained CNN 100) may be used to perform the task it has been trained to perform (in this case, super-resolution image processing). This process may be referred to inference. Inference in the example of FIG. 1 involves convolution of the kernels obtained during the training phase with the first image data to generate a series of feature maps using each of the convolutional layers 106a-106d. The feature maps may then be deconvolved using the deconvolutional layer 107 to generate the second version of the image, with a higher resolution of the first version of the image. An example of inference will now be described with reference to the example CNN 100 of FIG. 1.

In the CNN 100 of FIG. 1, the first convolutional layer 106a is arranged to extract a set of feature maps from the first image data. The feature maps for example represent image features present in the first version of the image such as corners or lines. The feature maps may be extracted using kernels. The precise features that the kernels identify will depend on the data used to train the CNN 100. For example, if the CNN 100 is trained on images of human faces, the kernels associated with the first convolution layer 106a may be able to identify features associated with human faces. The kernels may be of any size. As an example, each of the kernels associated with the first convolutional layer 106a may be a 3 by 3 matrix (although in other examples some of the kernels associated with a given layer of the CNN 100 may be of different sizes than others).

The kernels of the first convolutional layer 106a are convolved with the intensity values and the non-intensity feature values for pixels of the first version of the image, with a stride of 1. This for example involves multiplying each intensity value and each feature value of a pixel of the set of pixels (in this example a 3 by 3 set of pixels) by a weight in the kernel before adding the result of this operation to the result of the same operation applied to neighboring pixels. A stride for example refers to the number of pixels a kernel is moved by between each operation. A stride of 1 therefore indicates that, after calculating the convolution for a given 3 by 3 set of pixels, the kernel is slid across the image by 1 pixel and the convolution is calculated for a subsequent set of pixels. This process may be repeated until the kernel has been convolved with the entirety of the first version of the image. A kernel may sometimes be referred to as a filter kernel or a filter.

In this example, there are 64 kernels associated with the first convolutional layer 106a, and there are 1920 by 1080 pixels in the first version of the image. Hence, the output of the first convolutional layer 106a is 64 sets of 4×1920×1080 feature maps (one per kernel, and where the factor of 4 arises because there are 4 input components: the pixel intensity data 108a-108c for the three color channels, and the feature data 110).

Before processing the feature maps generated by the first convolutional layer 106a using the second convolutional layer 106b, a suitable activation function may be applied to the feature maps. An activation function (sometimes referred to as a rectifier) is a non-linear function, that may be used to map an input to a predefined output, such as a value which is 0 or greater. A suitable activation function is the rectified linear unit (ReLU) function, although other activation functions are possible such as a parametric rectified linear unit (PReLU) function.

The feature maps generated by the first convolutional layer 106a (which may have been processed using an activation function) are input to the second convolutional layer 106b, which in this example reduces a dimensionality of the feature maps. For example, there are fewer kernels associated with the second convolutional layer 106b than the first convolutional layer 106a.

The reduced dimensionality feature maps output by the second convolutional layer 106b are processed by the third convolutional layer 106c to perform a non-linear mapping between the reduced dimensionality feature maps and a patch of the second version of the image to be generated.

A dimensionality of an output of the third convolutional layer 106c is increased by the fourth convolutional layer 106d, to reverse the dimensionality reduction of the second convolutional layer 106b.

Finally, the second version of the image is generated by the deconvolutional layer 106e, which performs a deconvolution process to generate pixel intensity values from the feature maps output by the fourth convolutional layer 106d. In this way, the second version of the image is generated. The second version of the image has a second resolution which is higher than a first resolution of the first version of the image.

It is to be appreciated that the kernels of the convolutional layers 106b-106d and the deconvolutional layer 107 are convolved with the elements of the input to the respective layer in a similar way to the convolution performed by the first convolutional layer 106a. Furthermore, although not illustrated in FIG. 1, it is to be appreciated that a suitable activation function may be applied to an output of any given layer of the CNN 100 before the output is processed by a subsequent layer of the CNN 100.

As can be seen, processing the first image data using the CNN 100 generates an output 104, which in this example is second image data representative of the second version of the image. The second image data in this example includes three sub-sets of second image data 112a-112c. The three sub-sets of the second image data 112a-112c each represent pixel intensity values for the second version of the image for a different respective color channel (in this case, red, green and blue color channels). For example, a first sub-set of the second image data 112*a* may represent pixel intensity values for a red color channel of the second version of the image.

Hence, in this example, the first image data represents a first number of characteristics of the first version of the image and the second image data represents a second number of characteristics of the second version of the image, where the second number is less than the first number. In this context, a characteristic of an image may be considered to correspond to a channel or other separate element or component of the image. For example, in FIG. 1, the first version of the image includes four characteristics: three sub-sets of pixel intensity data 108*a*-108*c* and feature data 110. In contrast, the second version of the image includes three characteristics: three sub-sets of pixel intensity data 112*a*-112*c*. In this example, the second number of characteristics corresponds to a number of color channels of the second version of the image. However, this need not be the case. For example, the second image data may also include feature data, which may for example include fewer characteristics (for example by representing a smaller number of features) than the feature data of the first image data.

Figure 2:
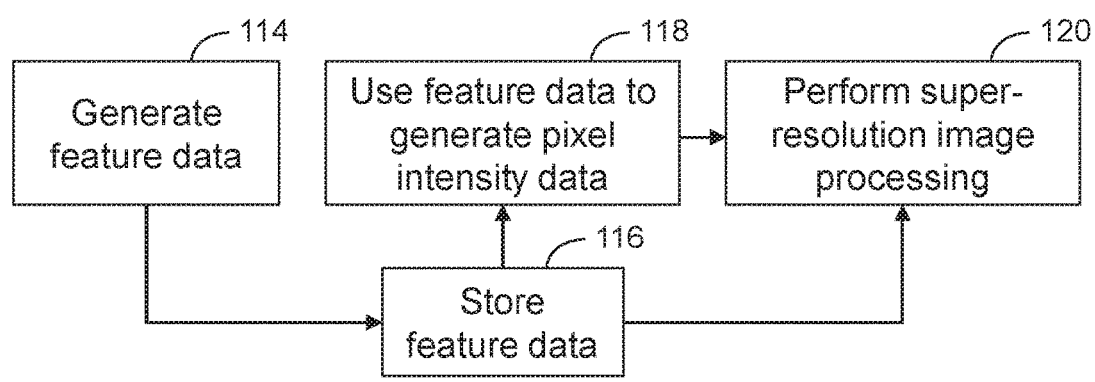
FIG. 2 is a flow diagram illustrating a method of super-resolution image processing according to examples.

The example of FIG. 1 illustrates an example of the use of feature data to perform super-resolution image processing. FIG. 2 is a flow diagram illustrating a method of super-resolution image processing according to further examples.

In the example of FIG. 2, feature data is used to both generate the pixel intensity data, and to perform super-resolution image processing. Hence, the feature data in this case provides a dual purpose. For example, the feature data may be pre-existing data that would be generated for a different purpose than super-resolution image processing (e.g. to generate the pixel intensity data), which may nevertheless be re-purposed or re-used for super-resolution image processing. The super-resolution image processing may therefore be improved in efficiency or accuracy without having to generate additional data.

At item 114 of FIG. 2, feature data is generated. Examples of the generation of feature data are discussed further with reference to FIGS. 3 to 13.

The feature data is stored at item 116 of FIG. 2 (although in other examples the feature data may instead be processed further without being stored).

Figure 5:
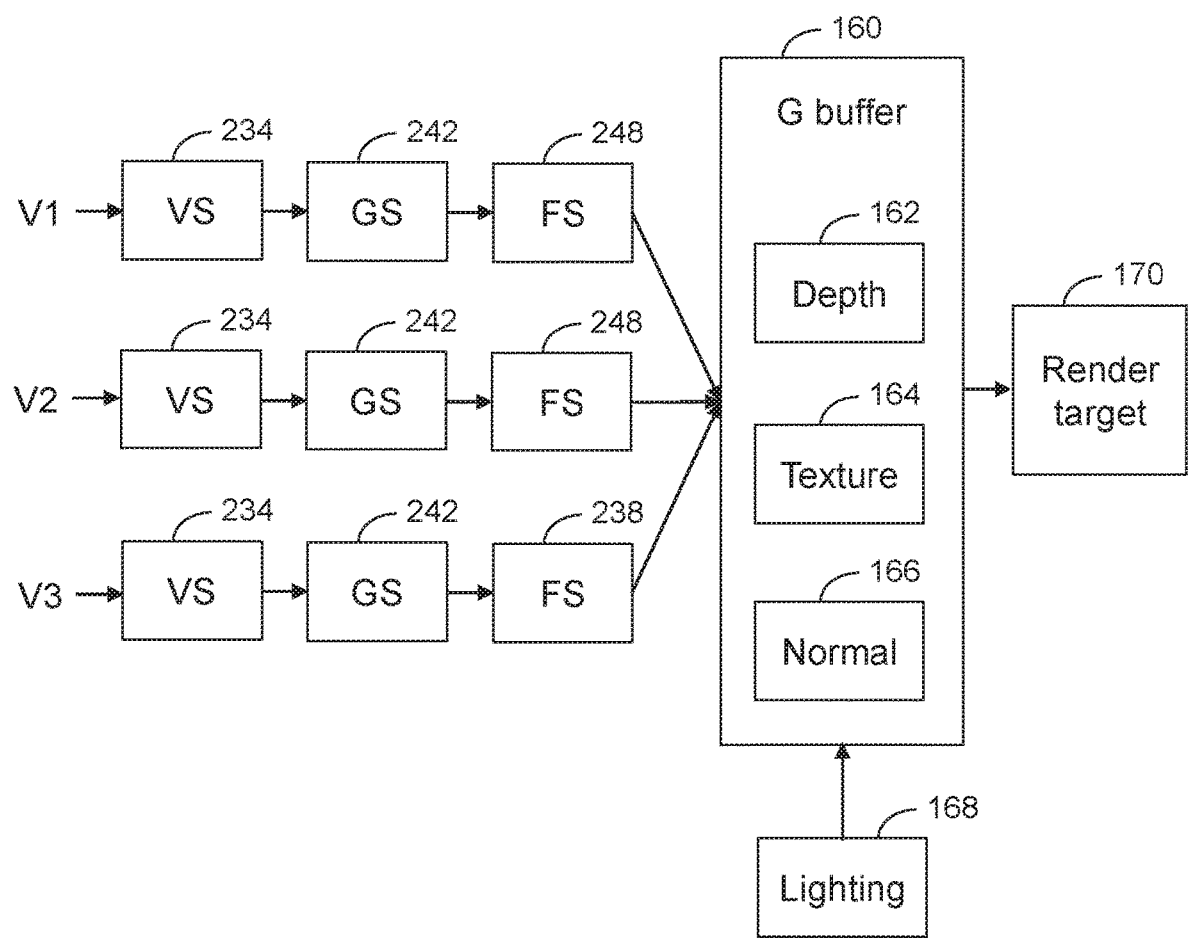
FIG. 5 is a schematic diagram illustrating a deferred shading process according to examples.

The feature data is used to generate the pixel intensity data at item 118 of FIG. 2, as discussed further with reference to FIG. 5. In this example, the feature data is retrieved from the storage for processing to generate the pixel intensity data, although this need not be the case in other examples.

At item 120, the pixel intensity data and the feature data are processed to perform super-resolution image processing. In FIG. 2, the feature data is retrieved from the storage for processing using the machine learning system to generate the second image data using super-resolution image processing. Hence, the feature data is retrieved from the storage and used for generating both the pixel intensity data and the second image data in the example of FIG. 2.

For example, the feature data may be generated as part of a graphics processing pipeline. In such cases, the storage used for storing the feature data may be local storage of a graphics processing system, allowing the feature data to be retrieved rapidly and efficiently. An example of a graphics processing system 122 is shown schematically in FIG. 3.

Figure 3:
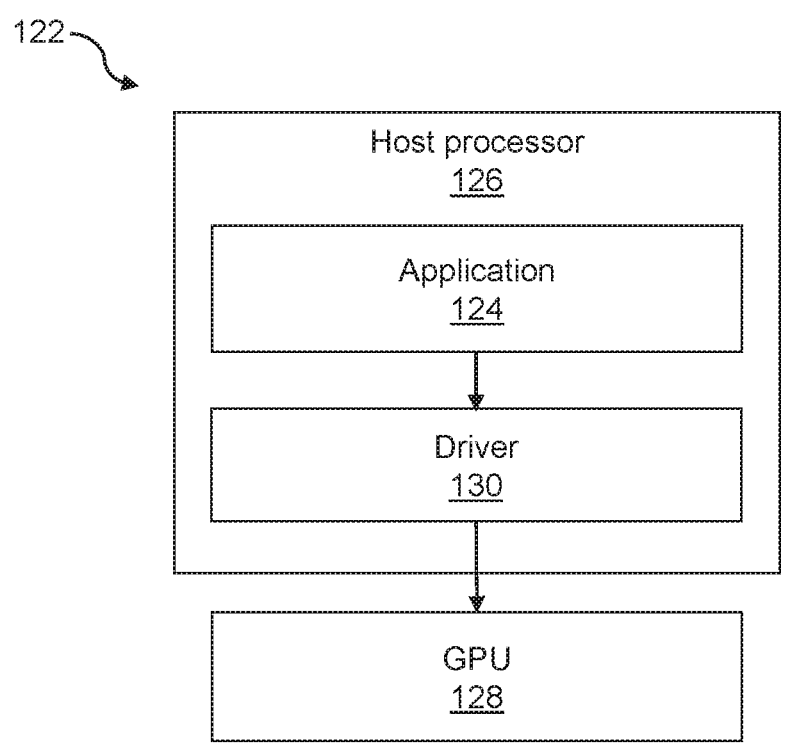
FIG. 3 is a schematic diagram illustrating a graphics processing system according to examples.

In the graphics processing system 122 of FIG. 3, an application 124, such as a game, executing on a host processor 126, which is for example a central processing unit (CPU), requests graphics processing operations to be performed by an associated graphics processor, which in this example is a graphics processing unit (GPU) 128. To do this, the application 124 generates application programming interface (API) calls that are interpreted by a programming interface, which in this example is a driver 130 for the GPU 128. The driver 130 runs on the host processor 126. The driver 130 generates appropriate commands to the GPU 128 to generate the graphics output requested by the application 124. A set of commands is provided to the GPU 128 in response to the commands from the application 124. The commands may be to generate a frame to be displayed on a display device coupled to or in communication with the host processor 126 and/or the GPU 128.

Figure 4:
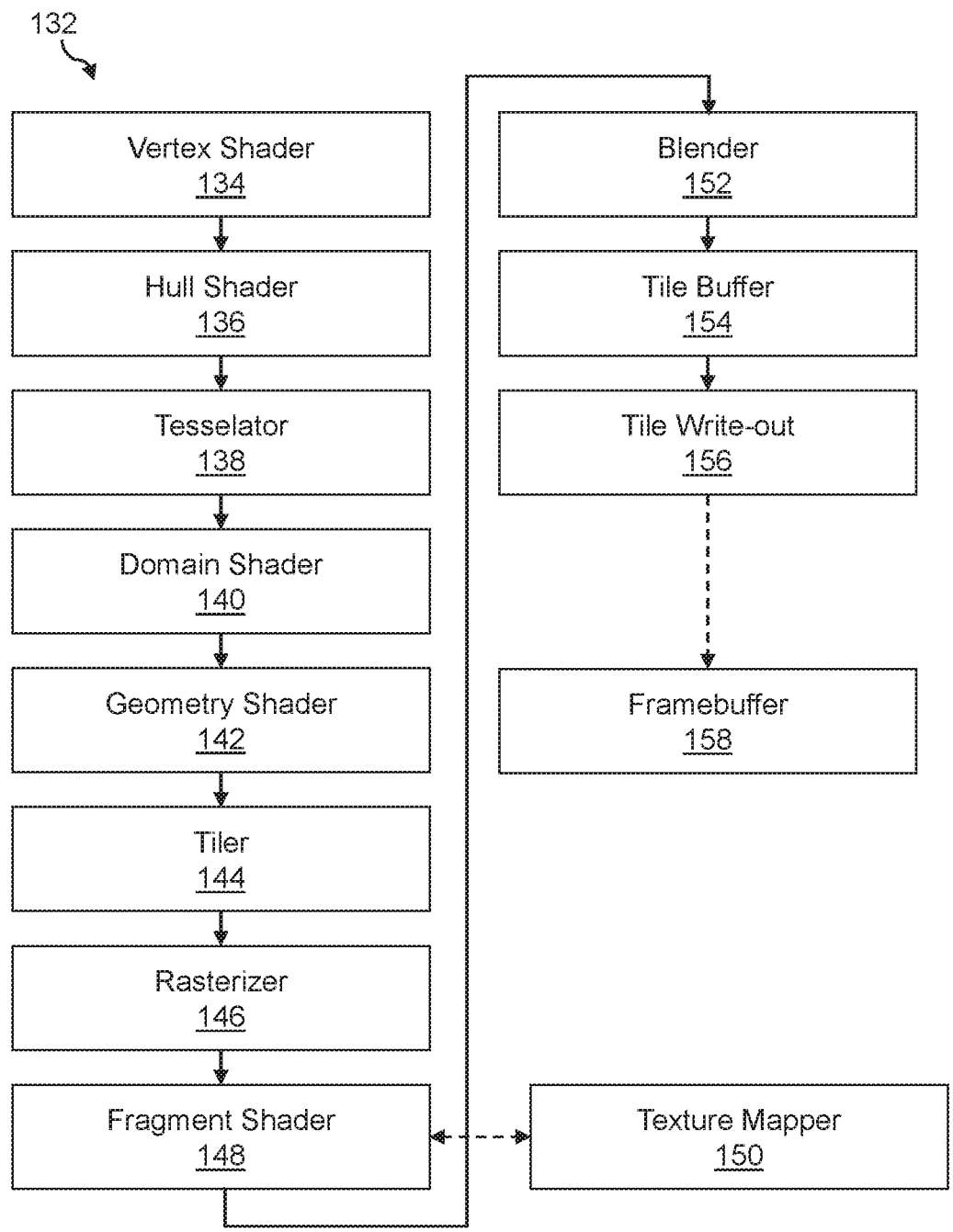
FIG. 4 is a schematic diagram illustrating a graphics processing pipeline according to examples.

FIG. 4 shows schematically an example of a graphics processing pipeline 132. The graphics processing pipeline 132 indicates a sequence of actions that may be performed by a graphics processor such as the GPU 128 of FIG. 3.

In this example, the GPU is a tile-based renderer. The GPU therefore produces tiles of a render output data array to be generated. The render output data array may be an output frame. Tile-based rendering differs from immediate mode rendering in that, rather than the entire render output being processed in one go, the render output is divided into a plurality of smaller sub-regions (or areas). Those sub-regions are referred to herein as tiles. Each tile is rendered separately. For example, each tile may be rendered one after another. The rendered tiles are then recombined to provide the complete render output for display. In tile-based rendering, the render output may be divided into regularly sized and shaped tiles. The tiles may be square or another shape. However, in other examples, the methods herein may be used with a different type of rendering, such as immediate rendering, rather than tile-based rendering.

The render output data array may be an output frame intended for display on a display device, such as a screen or printer. The render output may also, for example, include intermediate data intended for use in later rendering passes. An example of this is a "render to texture" output.

When a computer graphics image is to be displayed, it may first be defined as a set of geometries, for example as a series of primitives. An example of a primitive is a polygon. The geometries are then divided into graphics fragments in a rasterization process. This is followed by graphics rendering. During a graphics rendering operation, the renderer may modify data associated with each fragment so that the fragments can be displayed correctly. Examples of such data include the color and transparency. Once the fragments have fully traversed the renderer, then their associated data values are stored in memory, ready for output.

FIG. 4 shows various elements and pipeline stages associated with a graphics processing pipeline 132 according to examples. There may however be other elements and stages of the graphics processing pipeline that are not illustrated in FIG. 4.

As shown in FIG. 4, the graphics processing pipeline 132 includes a number of stages, including a vertex shader 134, a hull shader 136, a tesselator 138, a domain shader 140, a geometry shader 142, a tiler 144, a rasterization stage 146, a fragment shading stage 148, a texture mapping stage 150, a blending stage 152, a tile buffer 154 and a downsampling and writeout stage 156. Other arrangements for a graphics processing pipeline are however possible.

The vertex shader 134 receives input data values associated with the vertices defined for the output to be generated. The vertex shader 134 processes those data values to generate a set of corresponding, vertex-shaded, output data values for use by subsequent stages of the graphics processing pipeline 132.

Each primitive to be processed may be defined and represented by a set of vertices. Each vertex for a primitive may have associated with it a set of attributes. A set of attributes is a set of data values for the vertex. These attributes may include location data and other, non-location data (or "varyings"). The non-location data may represent, for example, color, light, normal and/or texture coordinates for the vertex in question.

A set of vertices is defined for a given output to be generated by the graphics processing pipeline. The primitives to be processed for the output include given vertices in the set of vertices. The vertex shading operation transforms the attributes for each vertex into a desired form for subsequent graphics processing operations. This may include, for example, transforming vertex location attributes from the world or user space for which they are initially defined to the screen space in which the output of the graphics processing system is to be displayed. In a graphics processing pipeline arranged to use forward rendering, this may also include, for example, modifying the input data to take account of the effect of lighting in the image to be rendered. However, for graphics processing pipelines in which deferred shading is used (such as that of FIG. 5), the effect of lighting may not be accounted for at this stage of the graphics processing pipeline.

The hull shader 136 performs operations on sets of patch control points and generates additional data known as patch constants.

The tessellation stage 138 subdivides geometry to create higher-order representations of the hull.

The domain shader 140 performs operations on vertices output by the tessellation stage, in a similar manner to the vertex shader 134.

The geometry shader 142 processes entire primitives such as a triangles, points or lines.

The vertex shader 134, hull shader 136, tesselator 138, domain shader 140 and geometry shader 142 set up the primitives to be rendered, in response to commands and vertex data provided to the graphics processing pipeline 132.

Once all the primitives to be rendered have been appropriately set up, the tiler 144 then determines which primitives are to be processed for each tile that the render output has been divided into for processing purposes. To do this, the tiler 144 compares the location of each primitive to be processed with the tile locations, and adds the primitive to a respective primitive list for each tile that it determines the primitive could potentially fall within. Any suitable and desired technique for sorting and binning primitives into tile lists, such as exact binning, or bounding box binning or anything in between, can be used for the tiling process.

Once lists of primitives to be rendered (or "primitive lists") have been prepared for each rendering tile in this way, the primitive lists are stored for use. The primitive lists allow the system to identify which primitives are to be considered and rendered when the tile in question is rendered.

Once the tiler 144 has prepared all of the tile lists, then each tile can be rendered. To do this, each tile is processed by the graphics processing pipeline stages that follow the tiler 144.

When a given tile is being processed, each primitive that is to be processed for that tile is passed to the rasterizer 146. The rasterizer 146 of the graphics processing pipeline 132 operates to rasterize the primitives into individual graphics fragments for processing. To do this, the rasterizer 146 rasterizes the primitives to sampling points and generates graphics fragments having appropriate locations for rendering the primitives. The fragments generated by the rasterizer 146 are then sent onwards to the rest of the graphics processing pipeline 132 for processing.

In examples, a Z (or "depth") test may be performed on fragments received from the rasterizer 146 to see if any fragments can be discarded (or "culled") at this stage (not shown in FIG. 4). To do this, an early Z and stencil test stage may compare the depth values of fragments issued by the rasterizer 146 with the depth values of fragments that have already been rendered. The depth values of fragments that have already been rendered may be stored in a depth buffer that is part of a tile buffer 154 (described further below). The comparison performed by the early Z and stencil test stage is to determine whether or not the new fragments will be occluded by fragments that have already been rendered. At the same time, an early stencil test may be carried out, in which a stencil value of a fragment is compared against a value in a stencil buffer. If the test is failed, the fragment may be culled. In other examples, though, the early Z and stencil test stage may be omitted.

The fragment shading stage 148 performs the appropriate fragment processing operations on fragments it receives from the rasterizer 146 to generate the appropriate rendered fragment data. This fragment processing may include any suitable fragment shading processes, such as executing fragment shader programs on the fragments to generate the appropriate fragment data, applying textures to the fragments, applying fogging or other operations to the fragments, etc. The fragment shading stage 148 may be a programmable fragment shader. For example, where the graphics processing pipeline 132 is a forward rendering pipeline, the fragment shader 148 may perform a lighting operation to account for direct and indirect lighting at each pixel of the fragments. This may be performed for each fragment, regardless of whether the fragment will visible in the render image or whether the fragment will be occluded by other fragments. This typically reduces an amount of data to be stored compared to other approaches (such as deferred shading, which is discussed further below), in which lighting is deferred to a later stage in the graphics processing pipeline.

In the example of FIG. 4, the fragment shader 148 passes the fragments to a texture mapper 150, which applies a texture to the fragments. The textured fragments are then passed back to the fragment shader 148.

As can be seen from FIG. 4, the graphics processing pipeline 132 includes a number of programmable processing or "shader" stages, namely the vertex shader 134, the hull shader 136, the domain shader 140, the geometry shader 142, and the fragment shader 148 (which in this example includes the texture mapper 150 stage). These programmable shader stages execute respective shader programs that have one or more input variables and generate sets of output variables. The shader program in question may be executed for each work item to be processed, for example for each vertex in the case of the vertex shader 134. An execution thread may be issued for each work item to be processed, and the thread then executes the instructions in the shader program to produce the desired, shaded, output data. As mentioned with reference to the vertex shader 134 and the fragment shader 148, execution of lighting operations using any of these shader stages may be performed for each vertex or primitive as it passes through the graphics processing pipeline 132 (regardless of whether it will be visible in the rendered image), in cases in which the graphics processing pipeline 132 uses forward rendering. However, in cases in which the graphics processing pipeline 132 uses deferred shading (such as that of FIG. 5), lighting operations may be deferred to a later stage.

After the fragment shader 148, there may then be a late fragment Z and stencil test stage, which carries out, amongst other things, an end of pipeline depth test on the shaded fragments to determine whether a rendered fragment will actually be seen in the final image. This depth test typically uses a Z-buffer value for the position of the fragment that is stored in the tile buffer 154 to determine whether the fragment data for the new fragments should replace the fragment data of the fragments that have already been rendered. This may involve comparing the depth values of the fragments issued by the fragment shader 148 with the depth values of fragments that have already been rendered, as stored in the Z-buffer. This late fragment depth and stencil test stage may also carry out late alpha and/or stencil tests on the fragments.

Data from the Z-buffer may be used as the feature data for input to a machine learning system arranged to perform super-resolution image processing, such as that of FIG. 1. Hence, depth data, representative of a depth of a fragment (or a pixel of the fragment) is an example of feature data. Using depth data for super-resolution image processing may improve the efficiency or effectiveness of the super-resolution image processing (for example by reducing the amount of computation to obtain a higher resolution version of an image with a given quality). Furthermore, as the depth data may be generated already, using existing processes that may be performed by a computing device (such as a graphics processing pipeline), the super-resolution image processing may be improved without requiring the generation of additional data. This further reduces the computational resources used by the super-resolution image processing.

Referring back to FIG. 4, the textured fragments output from the texture mapper 150 may then be subjected, in the blender 152, to any blending operations with fragments that are already stored in the tile buffer 154. Any other remaining operations to be applied to the fragments, such as dither, etc. may also be carried out at this stage.

Finally, the output fragment data (or "values") are written to the tile buffer 154. The depth value for an output fragment is also written appropriately to a buffer within the tile buffer 154. The tile buffer 154 stores color and depth buffers that store an appropriate color, etc., or depth, respectively, for each sampling point that the buffers represent. These buffers store an array of fragment data that represents part, in this example a tile, of the overall render output with respective sets of sample values in the buffers corresponding to respective pixels of the overall render output. For example, each 2×2 set of sample values may correspond to an output pixel, where 4× multisampling is used.

The tile buffer 154 may be provided as part of random access memory (RAM) that is local to the graphics processing pipeline 132. In other words, the tile buffer 154 may be provided in on-chip memory.

The data from the tile buffer 154 is input to a downsampling write out-unit 156, and then output (or "written back") to an external memory output buffer, such as a framebuffer 158 of a display device (not shown). The display device could include, for example, a display including an array of pixels, such as a computer monitor or a printer.

The downsampling and writeout unit 156 downsamples the fragment data stored in the tile buffer 154 to the appropriate resolution for the output buffer and device, such that an array of pixel data corresponding to the pixels of the output device is generated. This results in output values in the form of pixels for output to the output framebuffer 158.

In examples, the downsampled fragment data may represent a lower resolution version of an image than an output display device is capable of displaying. In such cases, the lower resolution version of the image (which for example corresponds to the first version of the image discussed with reference to FIG. 1), may be processed using the super-resolution image processing methods described herein. In this way, a second version of the image with a greater resolution may be generated.

Once a tile of the render output has been processed and its data exported to a main memory for storage, for example to the frame buffer 158 in a main memory, the next tile is then processed, and so on, until sufficient tiles have been processed to generate the entire render output. The process is then repeated for the next render output and so on.

As explained above, a graphics processing pipeline similar to the graphics processing pipeline 132 of FIG. 4 may be arranged to perform deferred shading. FIG. 5 illustrates schematically an example of a deferred shading process. Elements of FIG. 5 which are similar to corresponding elements of FIG. 4 are labelled using the same reference numerals but incremented by 100; corresponding descriptions are to be taken to apply.

In a forward rendering process, each of a series of vertices are independently processed using various shader stages of a graphics processing pipeline. This includes the application of lighting to each of the vertices (and fragments) separately, which is computationally expensive, especially as some of these vertices may not be present in the final rendered image (e.g. if they are occluded by other vertices).

However, in a deferred shading process (which is sometimes referred to as "deferred rendering"), lighting is applied at a later stage in the graphics processing pipeline. This is shown in FIG. 5. In FIG. 5, three vertices V1, V2, V3 are processed using various shader stages of a graphics processing pipeline. Three shader stages (a vertex shader 234, a geometry shader 242 and a fragment shader 248) are shown in FIG. 5. However, it is to be appreciated that other shader stages (such as those shown in FIG. 4) may also be present in some cases.

In FIG. 5, the lighting is deferred to a later stage. Lighting of fragments for example involves determining a shading to be applied to the fragments to give the effect of light falling on a surface of the fragments. In order to defer the application of lighting in this way, deferred shading involves performing a first pass in which no light shading is performed. The first pass of a deferred shading process is sometimes referred to as a geometry pass, and typically involves the generation of data that may be used subsequently for computation of lighting present at a graphics element. The data generated is for example geometry data representative of at least one geometry feature associated with a graphics element, such as a fragment (which for example includes a pixel to be rendered). A geometry feature for example relates to a position, angle or surface feature associated with a graphics element. In examples, the geometry data represents at least one of a depth, texture or surface normal of a graphics element such as a pixel.

A depth for example corresponds to a depth of the pixel with respect to a reference plane or reference position, such as a position associated with a camera (if the image is to be rendered as if captured by the point of view of the camera). A depth is for example a distance between the pixel and the reference plane or reference position. Such a distance may be taken in a direction perpendicular to the reference plane, for example.

A texture, which is typically two dimensional, may be applied or mapped onto the surface of a shape or polygon, which is for example three dimensional, before being rendered by the graphics processing pipeline. This generally allows more realistic or detailed images to be rendered. For example, detail on an object may be generated by applying a texture to a set of graphics primitives, such as polygons, representing the object, to give the object the appearance of the texture. A resolution of a texture may be different from the resolution of the pixels of a display device for displaying the rendered image. For example, a size of texture elements, sometimes referred to as texels (which may represent features or characteristics of the texture, such as a color or luminance value) may differ from a pixel size. Thus, there may not be a one-to-one mapping between a pixel and a texel. For example, one pixel may correspond to multiple texels or vice versa. However, a texture mapping process, which may be controlled by the fragment shader 238, may be used to determine a value, for example a texture value, for a position that corresponds to a pixel. For example, an interpolation process may be performed by a texture mapper associated with the fragment shader 238 to calculate the texture value associated with a given pixel. The texture value may be stored as part of the geometry data.

A surface normal for example represents an axis that is perpendicular to a surface associated with a given pixel. This for example indicates an angular inclination of the pixel, which may affect the shading present at the pixel.

In FIG. 5, the geometry data is stored in storage 160, from where it may be subsequently retrieved for further processing. The storage 160 is typically referred to as a geometry buffer (G-buffer), which may be a local storage of a graphics processor. In this way, deferred shading may decouple geometry of a scene to be rendered from lighting of a scene.

Although referred to as a G-buffer, the G-buffer typically includes a plurality of different buffers or other storage systems or components. For example, the G-buffer may include one buffer or storage area for each geometry feature to be stored. These buffers may be referred to as multiple render targets. In the example of FIG. 5, the G-buffer includes a depth buffer 162, a texture buffer 164 and a surface normal buffer 166, for storing depth data, color intensity data and surface normal data, respectively. It is to be appreciated that this is merely an example, though, and other G-buffers may include other render targets or more or fewer render targets.

After performing the geometry pass of the deferred shading process, a subsequent, second, pass may be performed. The second pass may be referred to as a lighting pass. The lighting pass may include the calculation of light at pixels the light affects (such as pixels that are not occluded by other pixels, or pixels that are sufficiently close to a light source the scene is to be lit by). Computation of lighting at pixels by a given light source that are unaffected by the light source may be omitted, reducing the number of computations to be performed. This therefore allows complex lighting to be performed in a less computationally intensive manner.

In FIG. 5, lighting 168 is applied to the multiple render targets stored in the G-buffer 160 to calculate an output render target 170. The render target 170 for example represents an output image (or image fragment). In other words, the render target 170 may correspond with the pixel intensity data for a first version of an image, and may therefore store pixel intensity values for pixels of the first version of the image. In this way, the geometry data stored in the G-buffer 160 (which is an example of feature data) may be used to generate the pixel intensity data.

As explained with reference to FIG. 2, super-resolution image processing may then be performed to increase a resolution of the first version of the image. For example, the pixel intensity data and the geometry data of the G-buffer (or a portion of the geometry data) may be processed using a machine learning system such as that of FIG. 1 to perform the super-resolution image processing.

Figure 6:
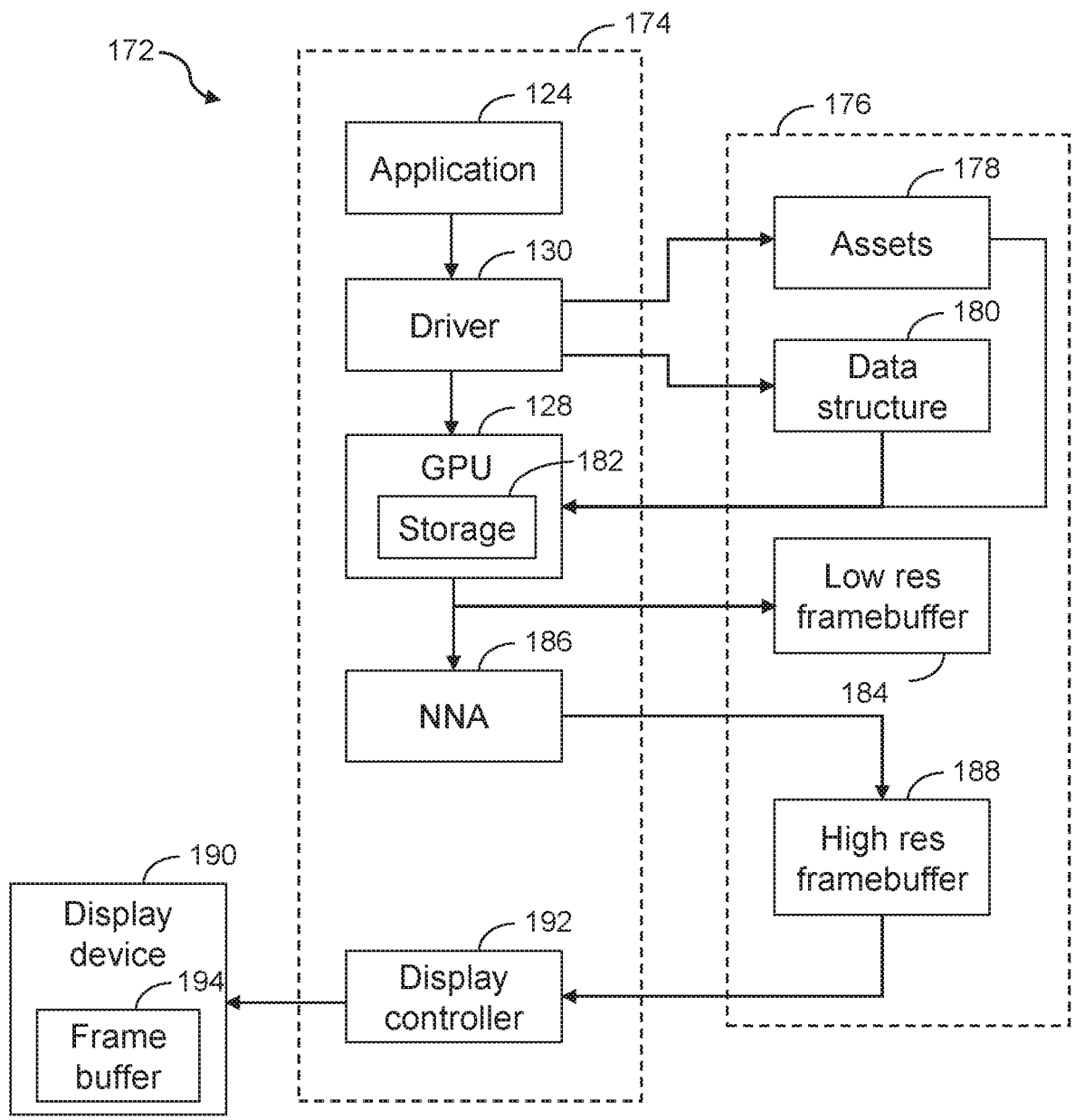
FIG. 6 is a schematic diagram illustrating internal components of a computing device according to examples.

FIG. 6 is a schematic diagram of internal components of a computing device 172 for use with the methods described herein. Features of FIG. 6 that are the same as corresponding features of the previous Figures are labelled with the same reference numerals; corresponding descriptions are to be taken to apply.

The computing device 172 is for example any electronic device with suitable processing capabilities to implement the super-resolution image processing methods described herein. The computing device 172 may be or include, amongst others, a cell phone, i.e. a mobile phone, for example a smartphone, a tablet, laptop or personal computer, a personal digital assistant, as well as various other electronic devices such as a game console. In the example of FIG. 6, the computing device 172 is arranged to perform super-resolution image processing using feature data generated as part of a graphics processing pipeline such as those described with reference to FIGS. 4 and 5.

The computing device 172 includes a processor system 174, which is arranged to implement various processing methods. Components of the processor system 174 may be communicatively coupled via at least one bus, which may have a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the processor system 174 comprises computer-useable volatile and/or non-volatile memory configured to store information and/or instructions for the processor components, which may be considered to correspond to local storage of the processor system 174. The computer-useable volatile and/or non-volatile memory may be coupled with the bus. The computer-useable memory may comprise random access memory (RAM) and/or read-only memory (ROM). In the example of FIG. 6, the processor system 174 includes a main processor of the computing device 172 (sometimes referred to as a central processing unit (CPU)), and the GPU 128. However, this is merely an example.

The GPU 128 may comprise a greater number of cores or processing units than the number of cores in the CPU. Each of the cores of the GPU 128 may, individually, be relatively slow and/or unsophisticated compared to any of the cores of the CPU. A given core of the GPU 128 may therefore be less suitable for performing complex computational tasks compared with a given core of the CPU. However, the relatively large number of cores in the GPU 128 enables certain computational tasks, for example tasks with a relatively high degree of parallelism, to be performed more efficiently by the GPU 128 than by the CPU since a relatively large number of processes may be carried out in parallel by the GPU 128. For example, the GPU 128 may perform certain image-related computational tasks more efficiently than the CPU, such as graphics rendering. The processor system 174 may form part of or include a system on a chip (SoC) arrangement.

In FIG. 6, an application 124 (such as a game or other application for which graphics are to be generated) is executed using the processor system 174. As explained with reference to FIG. 3, the application 124 generates API calls that are interpreted by the driver 130 for the GPU 128. The driver 130 is also executed using the processor system 174. The driver 130 generates appropriate commands to the GPU 128 to generate the graphics output requested by the application 124.

To generate the appropriate commands for the GPU 128, the driver 130 may request the use of data stored in a storage system 176 of the computing device 172. The storage system 176 may be a random access memory (RAM) such as DDR-SDRAM (double data rate synchronous dynamic random access memory). In other examples, the storage system 176 may be or include a non-volatile memory such as Read Only Memory (ROM) or a solid state drive (SSD) such as Flash memory. The storage system 176 in examples may include further storage devices, for example magnetic, optical or tape media, compact disc (CD), digital versatile disc (DVD) or other data storage media. The storage system 176 may be removable or non-removable from the computing device 172. In the example of FIG. 6, the storage system 176 is a main memory of the computing device 172, which may be referred to as a primary memory. The storage system 176 may be an external memory, in that the storage system 176 is external to the processing system 174. For example, the storage system 176 may include 'off-chip" memory. The storage system 176 may have a greater storage capacity than storage of the processor system 174, which may be "on-chip" storage. Control of the flow of data between the processor system 174 and the storage system 176 may be controlled by a memory controller, which may include a dynamic memory controller (DMC).

In FIG. 6, the storage system 176 includes first storage 178 for storing assets for use in the generation of graphics, such as texture maps. The storage system 176 also includes second storage 180 for storing a data structure for use in storing commands generated by the driver 130, which may subsequently be retrieved by the GPU 128.

The GPU 128 generates an image based on the instructions received from the driver 130. In the example of FIG. 6, the GPU 128 is arranged to use deferred rendering. The geometry data generated using a geometry pass of a deferred rendering process is stored in local storage 182 of the GPU 128, which is for example "on-chip" memory. The geometry data is subsequently retrieved from the local storage 182 of the GPU 128 during the lighting pass of the deferred rendering process to generate the pixel intensity data.

The pixel intensity data in the arrangement of FIG. 6 is representative of intensity values of at least one color channel of an image to be rendered (which may be referred to as a first version of an image). In FIG. 6, the image to be rendered is a color image, with three color channels: red, green and blue. Hence, in this case, the pixel intensity data represents intensity values of red, green and blue color channels.

The pixel intensity data is stored in a low resolution framebuffer 184 of the storage system 176. Although referred to as a buffer, it is to be appreciated that, in other examples, the low resolution framebuffer 184 may be another type of storage such as a cache.

The pixel intensity data is subsequently retrieved from the low resolution framebuffer 184 by a neural network accelerator (NNA) 186 and is processed in conjunction with the feature data (in this case, geometry data) obtained from the storage 182 of the GPU 128 to perform super-resolution image processing to increase a resolution of the first version of the image from a first resolution to a second resolution that is greater than the first resolution. An NNA is a processor dedicated to implementing the inference phase of a neural network. In this example, the NNA 182 is configured to implement a neural network which is trained to perform super-resolution image processing methods, such as those described herein. In other examples, though, a neural network may be implemented using a more general processor, such as the CPU or GPU 128. Alternatively, super-resolution image processing may be performed using a different machine learning system than a neural network, which may be performed using a dedicated processor or a more general processor.

Second image data representative of the higher resolution version of the image (which may be referred to as a second version of the image) is stored in a high resolution framebuffer 188. As for the low resolution framebuffer 184, in other examples, the high resolution framebuffer 188 may be different type of storage, such as a cache. It is to be appreciated that, in some cases, a framebuffer may store image data representative of a static image rather than data representative of a frame of a moving image, such as a video.

The second version of the image may be displayed on a display device 190 of the computing device 172. In FIG. 6, the display device 190 is internally coupled to the computing device 172, with the display device 190 forming part of the computing device 172 itself. For example, the display device 190 may be a display screen of a computing device 172 such as a smartphone; tablet, laptop or desktop computer; or personal digital assistant. Alternatively, the display device 190 may be an external device coupled to the computing device 250, for example a television screen or a computer monitor coupled to a laptop, desktop computer or game console via a High-Definition Multimedia Interface (HDMI) cable. The display device 190 may be any suitable display device such as a transmissive or transflective display device such as liquid crystal display (LCD) device, an electrowetting display device or an electrophoretic display device. Alternatively, the display device may be a display device in which pixels or picture elements of the display device generate light, such as an organic light emitting diode (OLED) display device or a plasma display device.

In FIG. 6, the display device 190 is instructed to display the second version of the image from the high resolution framebuffer 188 by a display controller 192 of the processor system 174. It is to be appreciated, though, that in other examples, the display controller 192 may receive the second image data directly after generation (in this case by the NNA 186) without the second image data having first been stored in, and retrieved from, the storage system 176. The second version of the image may be stored in local storage of the display device 190 (in this example, a display device framebuffer 194) prior to being displayed by the display device 190 (although this need not be the case in some examples). For example, in FIG. 6, the application 124 is a game, and the second version of the image is a frame of the game. Frames of the game may be stored temporarily in the display device framebuffer 194 and displayed at an appropriate frame rate (which may differ from a rate at which the frames are rendered by the graphics processor 128 or a rate at which super-resolution image processing is performed by the neural network accelerator 186). It is to be appreciated that an image as referred to herein may correspond to a still image or to a frame of a video. A video typically includes a series of frames (each of which corresponds to a still image), which may be shown sequentially to give the visual impression of a moving image. In other examples, the NNA 186 fetches the first version of the image from the low resolution framebuffer 184 and performs the super-resolution image processing as the first version of the image is acquired by a display processor of or coupled to the display device 190. So, the second version of the image (which is for example a higher resolution image) is generated and consumed by the display processor on-the-fly in this example. In such cases, the NNA 186 may form part of the display processor. Alternatively, the NNA 186 may form part of the display device 190 but may nevertheless be coupled to the display processor, or the super-resolution image processing may be performed by a different component than a NNA. Generation of the second version of the image in this way is facilitated by the fact that a computation rate of the NNA 186 (or other processor to perform the super-resolution image processing) and a display processor image display rate are typically deterministic and may be determined prior to display of images by the display device 190.

The components of the computing device 172 in the example of FIG. 6 may be interconnected using a systems bus. This allows data to be transferred between the various components, for example between the processor system 174 and the storage system 176, between the processor system 174 and the display device 190 or between the storage system 176 and the display device 174. The computing device 172 may include appropriate interfaces to enable the transfer of data between the various different components, as the skilled person will appreciate. The computing device 172 of FIG. 6 may also include a network interface for receiving data, such as image data, from a server device. The network interface of the computing device 172 may include software and/or hardware components, such as a virtual network interface, an Ethernet port, a software driver and/or communications stack interacting with network hardware.

Figure 7:
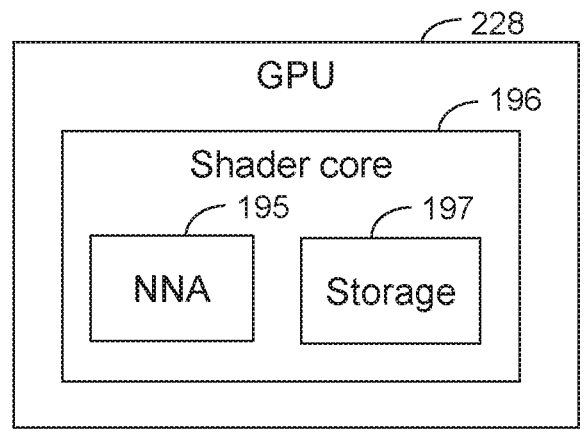
FIG. 7 is a schematic diagram illustrating internal components of a graphics processor according to examples.

FIG. 7 shows a graphics processor 228 that may be used in a computing device such as the computing device 172 of FIG. 6. In the example of FIG. 7, the graphics processor 228 itself is configured to implement a machine learning system to perform super-resolution image processing. In this case, the graphics processor 228 includes a neural network accelerator 195, which is arranged to implement a neural network such as those described above to increase a resolution of an image. The neural network accelerator 195 in FIG. 7 forms part of a shader core 196 of the graphics processor 228. The shader core 196, which may be considered to correspond to a shader processing unit, is arranged to implement instructions corresponding to a fragment shader stage of a graphics processing pipeline. For example, the shader core 196 may be arranged to perform lighting 168 in a deferred shading process such as that of FIG. 5, in addition to other aspects performed by the fragment shader 238. Hence, the shader core 196 may implement both generation of feature data (for example during a geometry pass of a deferred shading process) and subsequent super-resolution image processing using the feature data and pixel intensity data generated by the shader core 196. The pixel intensity data generated by the shader core 196 may be stored temporarily in local storage 197 of the shader core 196. This may facilitate the retrieval of the pixel intensity data for subsequent use by the neural network accelerator 195 to perform super-resolution image processing. For example, it may be more computationally efficient to retrieve data from local storage rather than from external storage.

A processing system including a graphics processor 228 such as that of FIG. 7 may omit a separate other processor for performing super-resolution image processing (such as the neural network accelerator 186 of FIG. 6).

Figure 8:
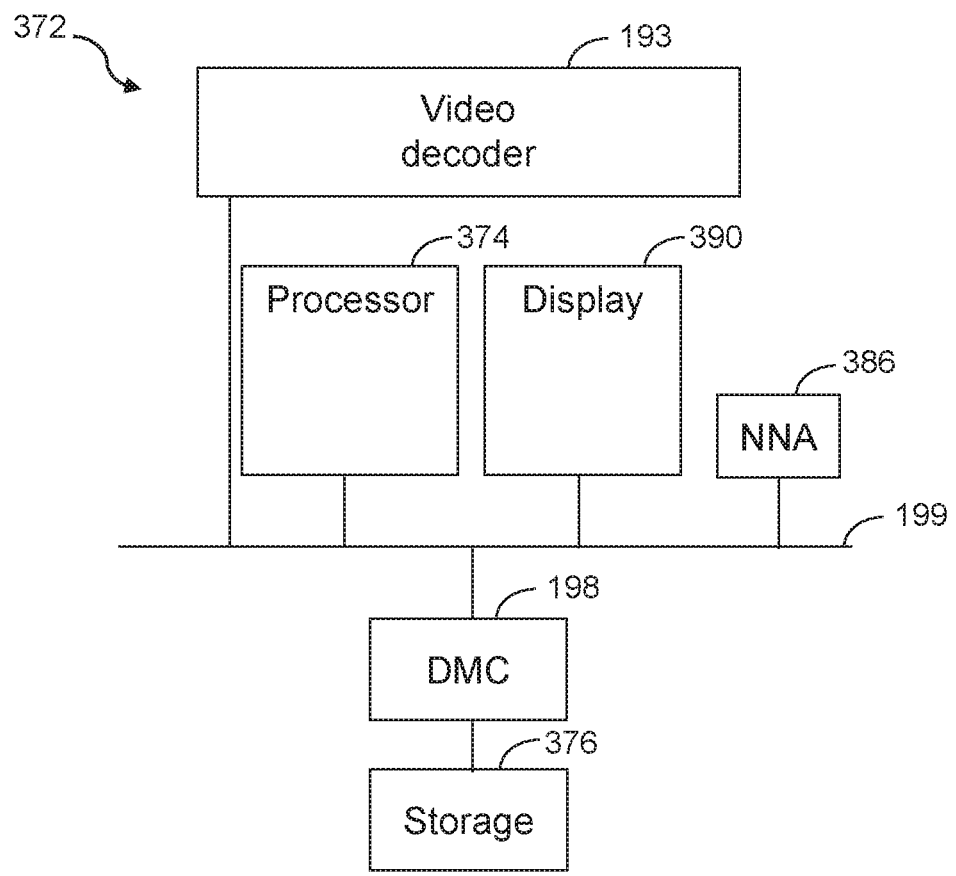
FIG. 8 is a schematic diagram illustrating internal components of a computing device according to further examples.

FIG. 8 shows a further example of a computing device 372 that may be used to perform super-resolution image processing. Features of FIG. 8 that are similar to corresponding features of FIG. 6 are labelled with the same reference numeral but incremented by 200. Corresponding descriptions are to be taken to apply.

In FIG. 8, super-resolution image processing is applied to an image obtained from a video decoder 193. For example, the computing device 372 of FIG. 8 may be used to increase a resolution of a standard definition (SD) video for display on a 4K display device, which for example has a horizontal display resolution of approximately 4,000 pixels. In this case, the first version of the at least part of the image (for which a first resolution is to be increased) corresponds to at least a portion of a frame of a video. The video in this example has previously been encoded using a suitable video encoding process. Encoding of the video for example compresses the video, to allow to it be more efficient stored or transferred. Suitable video codecs are the H.264 (MPEG-4 AVC or Advanced Video Coding) or H.265 (MPEG-H Part 2 or High Efficiency Video Coding) video compression standards, although these are merely examples. The video decoder 198 is arranged to decode the video, using the appropriate video codec.

In the example of FIG. 8, the video data decoded by the video decoder 193 includes feature data, which may be used subsequently to perform super-resolution image processing. In this way, both the pixel intensity data and the feature data may be obtained from the video decoder 193. For example, the feature data may be depth data representative of a depth of a given pixel with respect to a particular reference frame or point, such as a camera position of a camera used to capture the video. This may be the case where the video is intended to be viewed as a three-dimensional stereoscopic video (sometimes referred to as a 3D film). A typical 3D film is based on stereoscopic techniques, in which two offset two-dimensional (2D) videos are displayed separately to the left and right eye of a viewer. Once combined by the brain, these 2D videos give the appearance of 3D depth.

The computing device 372 of FIG. 8 also includes a processor system 374 and a storage system 376. The processor system 374 may be similar to the processor system 174 of FIG. 6 and for example includes a graphics processor and a central processor. The computing device 372 of FIG. 8 also includes a dynamic memory controller (DMC) 198 which may be used to control access to the storage system 376.

The computing device 372 of FIG. 8 includes a neural network accelerator (NNA) 386 which is arranged to perform super-resolution image processing. The NNA 386 receives the first image data representative of a first version of an image for which a resolution is to be increased from the video decoder 193 and generates second image data representative of a second version of the image with a higher resolution than the first version of the image. The first image data may be received directly from the video decoder 193 or may be stored first in the storage system 376 and subsequently retrieved from the storage system 376. As explained above, the first image data includes pixel intensity data and feature data.

In the example of FIG. 8, the NNA 386 is a separate component, which may for example be implemented in hardware. However, in other examples, a processor or processors arranged to implement the super-resolution image processing (such as an NNA) may instead or additionally form part of one of the other components of the computing device 372, such as the processor system 374 or the display device 390.

The components of the computing device 372 in the example of FIG. 8 are interconnected using a systems bus 199. This allows data to be transferred between the various components. The bus 199 may be or include any suitable interface or bus. For example, an ARM® Advanced Microcontroller Bus Architecture (AMBA®) interface, such as the Advanced eXtensible Interface (AXI), may be used.

In examples such as that of FIG. 8, in which an image for which a resolution to be increased is to be displayed as part of a stereoscopic image (which may be perceived as 3D by a viewer), the super-resolution image processing may include increasing the resolution of two different views of the same image. In such examples, the first version of the at least part of the image represents a first view of the at least part of the image, the pixel intensity data is first pixel intensity data representative of the intensity value of the at least one color channel of the pixel in the first view of the at least part of the image the feature data is first feature data representative of a depth of the pixel in the first view of the at least part of the image. The first view for example corresponds to a left-eye view of the image, from a position corresponding to a left eye of a viewer. In these cases, super-resolution image processing may be applied to third image data representative of a second view of the at least part of the image with a third resolution, to increase a resolution of the second view of the at least part of the image from the third resolution to a fourth resolution. The second view for example corresponds to a different view than the first view, such as a right-eye view of the image. The third image data may be similar to the first image data but from the perspective of the second view rather than the first view. For example, the third image data may include second pixel intensity data representative of an intensity value of at least one color channel of a pixel in the second view of the at least part of the image and second feature data representative of a depth of the pixel in the second view of the at least part of the image. In such cases, the third image data is processed using the machine learning system to generate fourth image data representative of a second version of the second view of the at least part of the image with a fourth resolution greater than the third resolution.

After generating higher resolution versions of two different views of the same image, these versions may be sent to the display device 390. For example, the second image data and the fourth image data may be sent to the display device 390 to display a stereoscopic version of the at least part of the image.

FIGS. 9a and 9b provide a further example of generation of feature data. In FIGS. 9a and 9b, the feature data is generated as part of a virtual reality (VR) image processing pipeline. FIGS. 9a and 9b illustrate schematically a display screen 400, for displaying a VR image. The display screen 400 may for example form part of a head-mounted display (HMD). A VR system is for example a system in which a computer-generated visualization is visible to a user rather than the real world. For example, the HMD may be designed to wrap around the head of a user so the user sees the interior of the HMD rather than the surrounding space.

FIG. 9a illustrates an object 402 to be displayed by the display screen 400 with the user's head in a first position with respect to the display screen 400. FIG. 9a illustrates the same object 402 to be displayed by the display screen 400 but with the user's head in a second position with respect to the display screen 400. In FIG. 9a, a pixel 404 of the display screen 400 displays a background of a scene. However, in FIG. 9b, the pixel 404 of the display screen 400 displays the object 402, which corresponds to a foreground of the scene. Hence, as the user's head position changes, the image to be displayed on the display screen 400 typically also changes, to compensate for movement of the user, so as to give the illusion that the user is immersed in the environment displayed on the display screen 400. It can, however, be difficult to compensate for movement of the user, which may be rapid compared to a rate at which new frames are generated by a graphics processor. Typically, a refresh rate of 90 to 100 frames per second is desirable to avoid the user perceiving a lag in the image displayed, which can cause the user to suffer from motion sickness. However, a typical graphics processing pipeline renders images at a rate of 30 frames per second.

To update the images sufficiently rapidly to avoid the user suffering from motion sickness, a process referred to as inbetweening (or tweening) may be used to generate intermediate frames between the frames generated by the graphics processing pipeline, to increase the refresh rate (at which frames are refreshed on the display screen 400) to a sufficiently high rate. Tweening relies on predicting where a user will be looking in the near future in order to generate an appropriate intermediate frame to compensate for motion of the user relative to the display screen 400.

FIG. 10 is a flow diagram illustrating features of a VR image processing method, that may be performed as part of a VR image processing pipeline. FIG. 10 shows an example of tweening.

At item 406 of FIG. 10, a first frame is generated. Generation of the first frame in this case includes generating first image data using a graphics processing system, for example as described with reference to any of FIGS. 5 to 7. The first image data therefore includes pixel intensity data representative of an intensity value of at least one color channel of a pixel of a first version of an image, and feature data representative of a value of at least one non-intensity feature associated with the pixel. In this case, the feature data includes depth data representative of a depth of the pixel with respect to a reference plane.

A further frame is generated at item 408 of FIG. 10. In this case, further image data is associated with the further frame. Such further image data is generated using the graphics processing system, in a similar way to generation of the first image data in this example. The further frame is to be displayed subsequently to the first frame. For example, the further frame may be the frame generated by the graphics processing system immediately after generation of the first frame. However, in other examples, the graphics processing system may generate one or more other frames between generation of the first frame and generation of the further frame.

In this example, a rate at which the first and further frames are generated corresponds to a maximum rendering rate of the graphics processing system. To generate frames at a higher rate than this, the method of FIG. 10 instead involves interpolating the first and further frames to generate at least one intermediate frame (in this example, an intermediate frame). This is shown at item 410 of FIG. 10. In the example of FIG. 10, generation of intermediate image data associated with the intermediate frame, which in this example involves interpolation, includes use of at least the depth data generated during generation of the first image data and head motion data received from a head-mounted display (HMD) for displaying the intermediate frame.

Headtracking may be used to determine a position of the user's head at a relatively high rate. For example, a head position of a user may be calculated at around 120 frames per second to determine which part of a display screen of the HMD the user is looking at. Headtracking may therefore be used to generate the head motion data used to generate the intermediate image data in this example.

In FIG. 10, asynchronous time warp (ATW) is used to generate the intermediate image based on head tracking information (for example as represented by the head motion data), which may be displayed as an intermediate frame between the two frames generated by the graphics processing pipeline (in this case, the first and further frames). In this case, the intermediate image is interpolated from the first and further frames, but taking into account motion of the user. However, in other examples, other methods than ATW may be used to generate an intermediate frame that also accounts for user motion. For example, asynchronous space warp (ASW) may instead or additionally be used. Typically, ASW uses depth data associated with pixels of an image to be displayed, to perform ASW image interpolation appropriately.

The depth data generated during generation of the first frame may be used as feature data for super-resolution image processing, as discussed with reference to other examples, in addition to being used for tweening. Hence, the super-resolution image processing in such cases may use pre-existing depth data that would nevertheless be generated for other purposes (in this case, tweening). The super-resolution image processing may therefore be more efficient and use fewer processing and/or memory resources than in other cases in which the feature data is generated specifically for super-resolution image processing and is not used for other purposes.

In FIG. 10, the first frame is displayed, using the HMD, at item 412. Item 412 also includes displaying, using the HMD, the intermediate frame, subsequently to the first frame, and the further frame, subsequently to the intermediate frame. It is to be appreciated that some or all of the first, intermediate and/or further frames may be higher resolution frames. For example, the first frame and the further frame may undergo super-resolution image processing as described with reference to other examples. The generation of the intermediate frame typically involves interpolation of image data associated with the first and further frames. In such cases, the first and further frames may have undergone super-resolution image processing before interpolation of the first and further frames to generate the intermediate frame. In this way, the intermediate frame may also have a higher resolution than if interpolated from the first and further frames prior to super-resolution image processing.

In examples such as FIG. 10, at least the first and further frames are typically stored temporarily before being displayed. This provides sufficient time to generate intermediate frames before displaying the first, intermediate and further frames are displayed, at a higher frame rate than generation of the first and further frames. It is to be appreciated that the intermediate frame may also be temporarily stored. In this way, a series of frames may be pre-emptively generated and stored, to reduce the risk of a delay in display of the series of frames, which may otherwise occur if the series of frames are generated at a slower rate than a desired display refresh rate.

Figure 11:
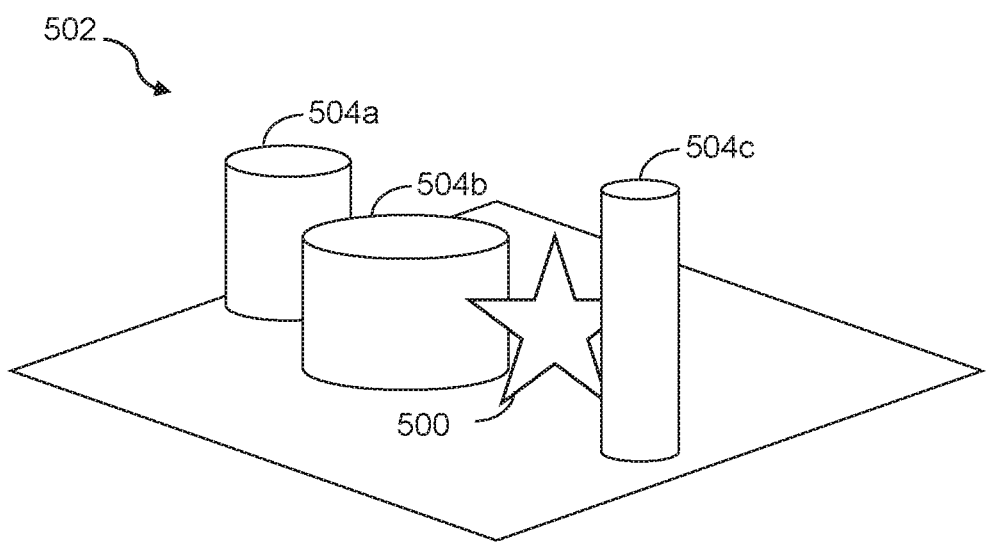
FIG. 11 is a schematic diagram illustrating display of an image using an augmented reality (AR) system according to examples.

In other examples, feature data for super-resolution image processing may be generated as part of an augmented reality (AR) image processing pipeline. With AR, a real-world space is typically visible to a user, but with additional information (such as an image) also visible, for example as an overlay. FIG. 11 shows such an example. In FIG. 11, an image 500 is to be displayed within a real-world scene 502, which includes three objects 504a, 504c, 504c. In order to display the image 500 with an appropriate position with respect to the other objects 504a-504c of the scene 502, object depth information may be used. For example, based on the depth of the image 500, it may be determined whether the image (or parts of the image) should be occluded by real-world objects 504a-504c in the scene 502. This can be seen in FIG. 11, in which the two rightmost points of the image 500 (which in this case is an image of a star) are behind the third object 504c and are therefore occluded by the third object 504c. Hence, pixels corresponding to the two rightmost points of the image 500 may not be rendered by a display arranged to display the image 500. However, the remainder of the image 500 is in front of the first and second objects 504a, 504b of the scene 502 and are therefore displayed by the display.

Super-resolution image processing may use depth data generated by an AR image processing pipeline as feature data. For example, such depth data may represent a depth of a pixel with respect to a reference plane. In such cases, an occlusion of the pixel may be determined using the depth data to generate an appropriate AR image for display. This depth data may also be used by the machine learning system (in conjunction with the pixel intensity data) to generate the second image data.

Determining an occlusion of a pixel may include generating a depth map of a scene 502 onto which the at least part of the image 500 is to be projected (which is for example the same at least part of the image processed using super-resolution image processing). It may then be determined, based on the depth data and the depth map, whether the pixel is occluded by at least a portion of a scene 502.

The depth map may be generated in various different ways. For example, an image of the scene 502 may be captured using a suitable image capture device, such as a camera. Image data representative of the image of the scene 502 may be processed using a further machine learning system to generate the depth map. For example, a monodepth neural network may be used to process the image data to generate the depth map. In other cases, though, the depth map may be generated using a different method, such as using a depth sensor, such as a time-of-flight sensor. A time-of-flight sensor typically includes a light source, such as an infrared light source. The time-of-flight sensor measures a time for light emitted from the light source to return to a light sensor. As the speed of light is constant, the distance between the time-of-flight sensor can be determined from the measured time. It is to be appreciated that, in other examples, other depth sensors may be used instead of (or as well as) a time-of-flight sensor. For example, a depth sensor using the principles of stereo triangulation may be used, in which images of a scene are captured from at least one camera in a plurality of different positions. Other depth sensors include those based on sheet of light triangulation, in which a scene is illuminated with a sheet of light and a depth of points in the scene is determined based on the sheet of light as reflected by the scene, or structured light, in which a scene is illuminated using a predetermined light pattern and a depth of points in the scene is determined based on an image of light reflected by the scene.

Figure 12:
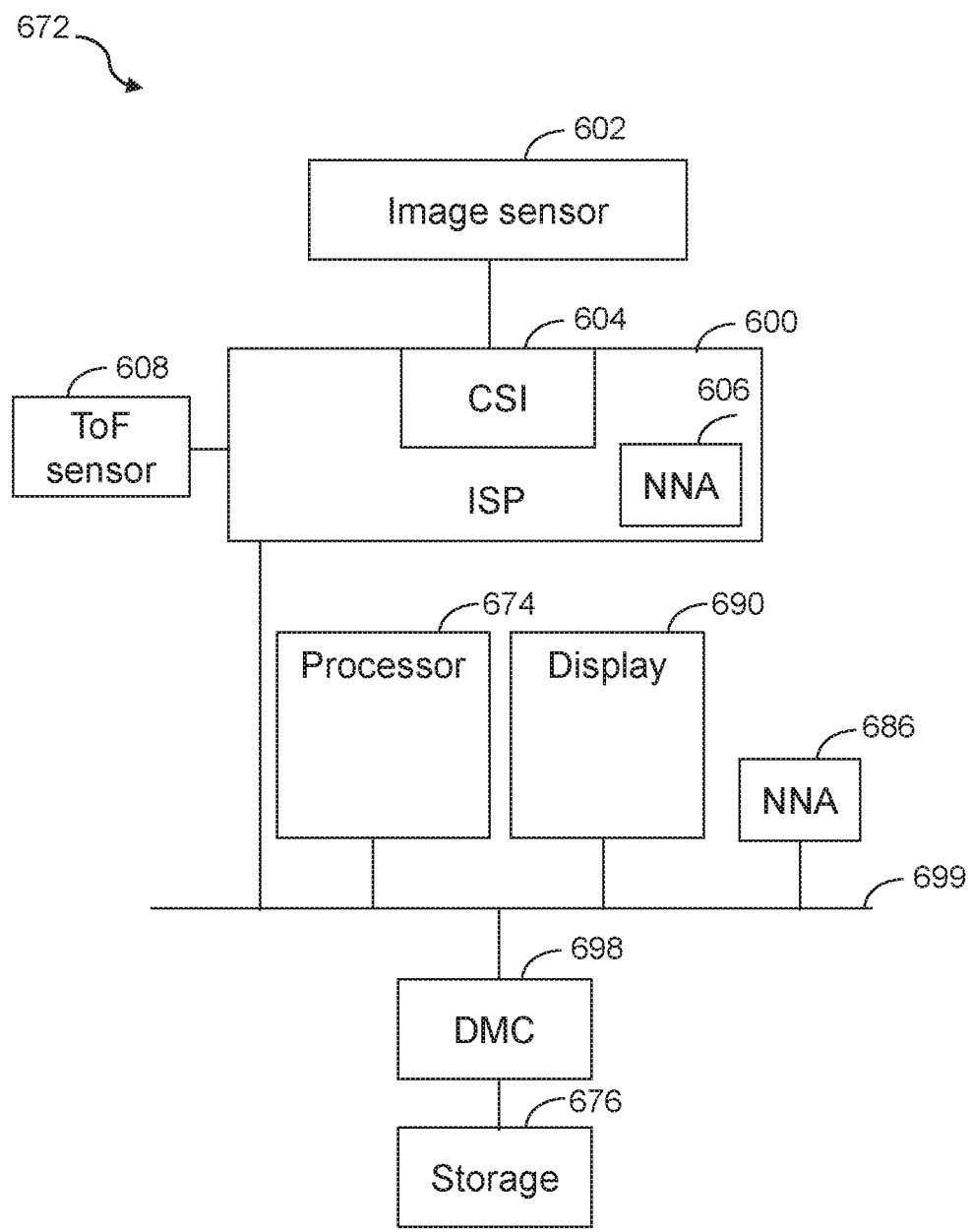
FIG. 12 is a schematic diagram illustrating internal components of a computing device according to yet further examples.

FIG. 12 illustrates schematically a computing device 672 for use in an AR image processing pipeline. The computing device 672 of FIG. 12 may be used to obtain depth data for use in AR image processing and super-resolution image processing, for example as described with reference to FIG. 11. Features of FIG. 12 which are similar to corresponding features of FIG. 8 are labelled with the same reference numeral but prefaced by a "6" rather than a "1" or a "3". Corresponding descriptions are to be taken to apply.

In FIG. 12, rather than obtaining feature data from a video decoder, the feature data is instead obtained from an image signal processor 600. The image signal processor (ISP) 600 is coupled to an image sensor 602 via a camera-serial interface 604. The ISP 600 may perform initial processing of image data to prepare the image for display. For example, the ISP 600 may perform saturation correction, renormalization, white balance adjustment and/or demosaicing, although this is not to be taken as limiting.

In FIG. 12, a depth map may be obtained in two different ways: either via the neural network accelerator (NNA) 606 of the ISP 600 or via a time-of-flight (ToF) sensor 608. The NNA 606 is arranged to obtain a depth map from a captured image of a scene, for example by processing the image using a further machine learning system such as a monodepth neural network. Typically, though, a computing device may include solely a ToF sensor or a neural network accelerator for obtaining a depth map, rather than both.

Depth data representative of a depth of a pixel to be rendered, for example with respect to a scene captured by the image sensor 602 may for example be generated by the ISP 600 or by a further processor, such as a processor of the processing system 674. After obtaining the depth data, the computing device 672 is arranged to process the depth data, along with pixel intensity data (which may be pixel intensity data of pixels of an AR image to be displayed by the display device 690), to perform super-resolution image processing of the AR image to be displayed, in a similar way to the computing device 372 of FIG. 8.

Figure 13:
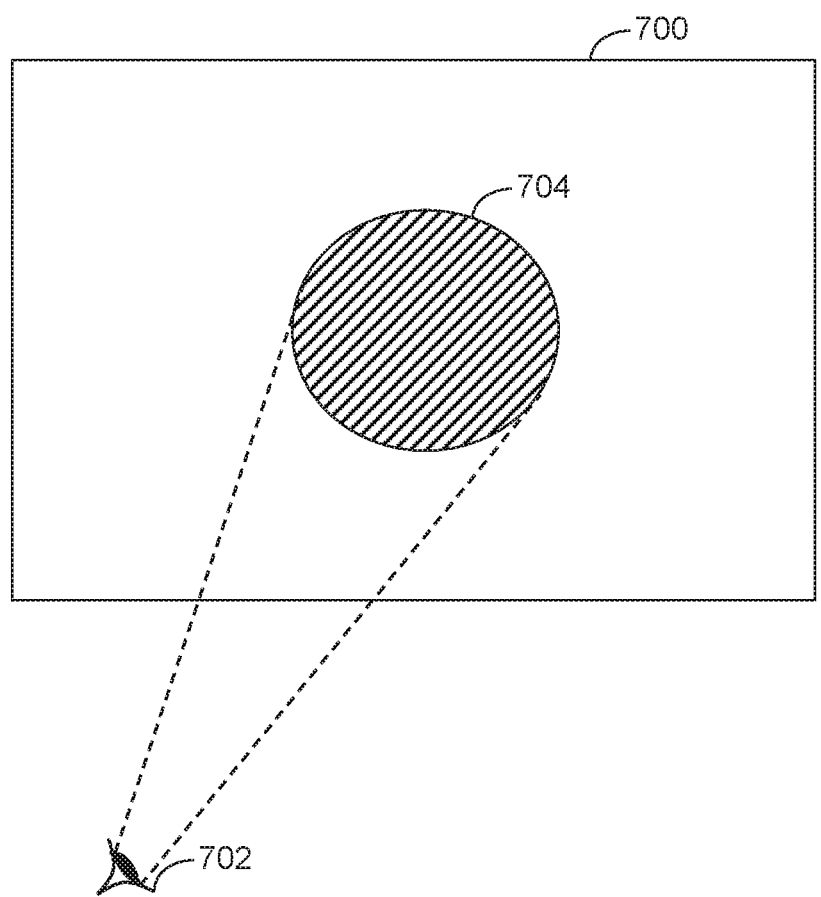
FIG. 13 is a schematic diagram illustrating display of an image using gaze tracking according to examples.

FIG. 13 shows schematically a further example in which super-resolution image processing may be performed. FIG. 13 shows a display device 700 for display an image. The display device 700 is viewed by a viewer 702, who is focusing on a target region 704 of the display device 700. As the attention of the viewer 702 is focused on the target region 704, reduced image quality will be less noticeable to the viewer 702 in other regions of the display device 700. Hence, to reduce processing demands, super-resolution image processing may be performed solely for at least part of an image which is identified as being associated with a gaze direction of a viewer 702, so that the at least part of the image is a target region 704 of a larger image. In such cases, the larger image may be divided up into portions and solely portions associated with the gaze direction of the viewer may undergo super-resolution image processing.

The gaze direction of the viewer 702 may be determined using an eye-tracking device. An eye-tracking device may include one or more eye-tracking sensors configured to track eye movement and/or determine a gaze location and/or gaze direction of a viewer of an image. The eye-tracking device may be included in the display device 700 in some examples. For example, where the display device 700 comprises an HMD, the eye-tracking device may form part of and/or be mounted upon the HMD. In other examples, though, the eye-tracking device is separate from the display device 700.

The above examples are to be understood as illustrative examples. Further examples are envisaged.

In the example of FIG. 1, the CNN 100 is used to increase a size of the image between the first version of the image (input to the CNN 100) and the second version of the image (output by the CNN 100), by performing super-resolution image processing. However, in other examples, the first version of the image may be increased in size prior to being input to the CNN 100. For example, the pixel sizes of each of the pixels of the first version of the image may be increased so that the overall size of the first version of the image is the same as a desired size of the second version of the image. Alternatively, the pixel sizes of each of the pixels of the first version of the image may remain the same, but new pixels may be generated so that the size of the first version of the image corresponds to a desired size of the second version of the image. These new pixels may be generated using any suitable method, such as copying existing pixel intensity values for neighboring pixels to a new pixel location, using default or predetermined pixel intensity values, or using an interpolation process to estimate a pixel intensity value for a new pixel with a location between two neighboring existing pixels.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of super-resolution image processing, the method comprising:
   inputting first image data representative of a first version of at least part of an image with a first resolution to a machine learning system, the first image data comprising:
   pixel intensity data representative of an intensity value of at least one color channel of a pixel of the first version of the at least part of the image; and
   feature data representative of a value of at least one non-intensity feature associated with the pixel; and
   processing the first image data using the machine learning system to generate second image data representative of a second version of the at least part of the image with a second resolution greater than the first resolution.

2. The method according to claim 1, comprising using the feature data to generate the pixel intensity data.

3. The method according to claim 2, comprising:
   retrieving the feature data from storage for processing to generate the pixel intensity data; and, subsequently,
   retrieving the feature data from the storage for processing using the machine learning system to generate the second image data.

4. The method according to claim 3, wherein the storage is local storage of a graphics processing system.

5. The method according to claim 2, wherein the feature data comprises geometry data representative of at least one geometry feature associated with the pixel and the method comprises:
   generating the geometry data using a geometry pass of a deferred shading process; and, subsequently, generating the pixel intensity data by processing the geometry data using a lighting pass of the deferred shading process.

6. The method according to claim 1, wherein the at least one non-intensity feature is at least one of:
a depth of the pixel with respect to a reference plane;
a texture associated with the pixel; or
a surface normal of a surface associated with the pixel.

7. The method according to claim 1, wherein the machine learning system is a convolutional neural network (CNN).

8. The method according to claim 1, wherein the first image data represents a first number of characteristics of the first version of the at least part of the image and the second image data represents a second number of characteristics of the second version of the at least part of the image, the first number of characteristics being larger than the second number of characteristics.

9. The method according to claim 8, wherein the second number of characteristics corresponds to a number of color channels of the second version of the at least part of the image.

10. The method according to claim 1, wherein the at least part of the image is a target region of a larger image, which target region is identified as being associated with a gaze direction of a viewer.

11. The method according to claim 1, wherein the feature data is generated as part of a virtual reality (VR) image processing pipeline or an augmented reality (AR) image processing pipeline.

12. The method according to claim 1, wherein the feature data is generated as part of a virtual reality (VR) image processing pipeline, the feature data comprises depth data representative of a depth of the pixel with respect to a reference plane, and the VR image processing pipeline comprises:
generating the first image data using a graphics processing system, wherein the first image data is associated with a first frame and generating the first image data comprises generating the depth data;
generating further image data using the graphics processing system, wherein the further image data is associated with a further frame, to be displayed subsequently to the first frame; and
generating intermediate image data associated with an intermediate frame, to be displayed between display of the first frame and display of the further frame, wherein generating the intermediate image data comprises use of the depth data and head motion data received from a head-mounted display for displaying the intermediate frame.

13. The method according to claim 1, wherein the feature data comprises depth data generated as part of an augmented reality (AR) image processing pipeline, which depth data represents a depth of the pixel with respect to a reference plane, and the method comprises determining an occlusion of the pixel using the depth data.

14. The method according to claim 13, wherein determining the occlusion of the pixel comprises:
generating a depth map of a scene onto which the at least part of the image is to be projected; and
determining, based on the depth data and the depth map, whether the pixel is occluded by at least a portion of the scene.

15. The method according to claim 14, comprising at least one of:
a) capturing an image of the scene; and
processing image data representative of the image of the scene using a further machine learning system to generate the depth map; or
b) generating the depth map using a depth sensor.

16. The method according to claim 1, wherein the first version of the at least part of the image corresponds to at least a portion of a frame of a video and the method comprises obtaining the pixel intensity data and the feature data from a video decoder.

17. The method according to claim 1, wherein:
the first version of the at least part of the image represents a first view of the at least part of the image;
the pixel intensity data is first pixel intensity data representative of the intensity value of the at least one color channel of the pixel in the first view of the at least part of the image;
the feature data is first feature data representative of a depth of the pixel in the first view of the at least part of the image; and
the method comprises:
inputting third image data representative of a second view of the at least part of the image with a third resolution to the machine learning system, the third image data comprising:
second pixel intensity data representative of an intensity value of at least one color channel of a pixel in the second view of the at least part of the image; and
second feature data representative of a depth of the pixel in the second view of the at least part of the image; and
processing the third image data using the machine learning system to generate fourth image data representative of a second version of the second view of the at least part of the image with a fourth resolution greater than the third resolution.

18. The method according to claim 17, comprising sending the second image data and the fourth image data to a display, for displaying a stereoscopic version of the at least part of the image.

19. A processing system configured to perform super-resolution image processing, wherein the processing system is configured to:
retrieve, from storage accessible to the processing system, first image data representative of a first version of at least part of an image with a first resolution, the first image data comprising:
pixel intensity data representative of an intensity value of at least one color channel of a pixel of the first version of the at least part of the image; and
feature data representative of a value of at least one non-intensity feature associated with the pixel; and
implement a machine learning system to perform the super-resolution image processing by, upon receipt of the first image data as an input, processing the first image data to generate second image data representative of a second version of the at least part of the image with a second resolution greater than the first resolution.

20. The processing system according to claim 19, comprising a graphics processor configured to:
implement a deferred shading process to generate the feature data; and
store the feature data in local storage of the graphics processor, wherein the processing system is configured to retrieve the feature data from the local storage for processing using the machine learning system to generate the second image data.

* * * * *